(12) United States Patent
Wilson (10) Patent No.: US 10,646,843 B2
(45) Date of Patent: May 12, 2020

(54) REMOVING PARTICULATES

(71) Applicant: Wilson Bio-Chemical Limited, York (GB)

(72) Inventor: Thomas Steven Wilson, Middle Handley (GB)

(73) Assignee: Wilson Bio-Chemical Limited, Dunnington, York (GB)

( * ) Notice: Subject to any disclaimer, the term of this patent is extended or adjusted under 35 U.S.C. 154(b) by 68 days.

(21) Appl. No.: 15/697,611

(22) Filed: Sep. 7, 2017

(65) Prior Publication Data

US 2018/0065099 A1    Mar. 8, 2018

(30) Foreign Application Priority Data

Sep. 8, 2016   (GB) .................................. 1615341.3

(51) Int. Cl.

| | | |
|---|---|---|
| *B01D 45/00* | (2006.01) | |
| *B01J 3/00* | (2006.01) | |
| *B09B 3/00* | (2006.01) | |
| *B01D 49/00* | (2006.01) | |
| *B01D 45/08* | (2006.01) | |
| *B01D 29/00* | (2006.01) | |
| *B01J 3/04* | (2006.01) | |

(52) U.S. Cl.
CPC .......... *B01J 3/002* (2013.01); *B01D 29/0002* (2013.01); *B01D 45/08* (2013.01); *B01D 49/00* (2013.01); *B01J 3/04* (2013.01); *B09B 3/0091* (2013.01)

(58) Field of Classification Search
CPC .. B01J 3/002; B01J 3/04; B01D 45/08; B01D 49/00; B01D 29/0002; B09B 3/0091
See application file for complete search history.

(56) References Cited

U.S. PATENT DOCUMENTS

| | | | | |
|---|---|---|---|---|
| 960,223 A | * | 5/1910 | Guillaume | B01D 3/008 261/110 |
| 2,685,498 A | * | 8/1954 | Dickinson | B01J 8/388 208/156 |
| 3,092,471 A | * | 6/1963 | Stromeyer | F28C 3/14 165/109.1 |
| 3,462,345 A | * | 8/1969 | Jabsen | G21C 7/12 376/230 |
| 3,728,239 A | * | 4/1973 | McDonald | B01J 8/125 208/150 |

(Continued)

FOREIGN PATENT DOCUMENTS

| | | |
|---|---|---|
| CN | 104190165 A | 12/2014 |
| JP | 2006081962 A | 3/2006 |

(Continued)

*Primary Examiner* — Dung H Bui
(74) *Attorney, Agent, or Firm* — James Creighton Wray (57) ABSTRACT

In a solid waste treatment system comprising an autoclave (201) not having a particulate filter at its outlet, a method of removing particulates suspended in steam discharged from the autoclave following processing of solid waste is disclosed. The method includes discharging steam from the autoclave; routing the steam to the inlet (301) of a separation vessel (209) that further includes an outlet (303) and a baffle (302) between the inlet and the outlet; and collecting particulates (304) that drop from suspension in the steam at the bottom of the separation vessel. The baffle is configured so that steam is incident upon the baffle to reduce its flow velocity.

16 Claims, 6 Drawing Sheets

(56) References Cited

U.S. PATENT DOCUMENTS

| | | | | |
|---|---|---|---|---|
| 4,175,937 A * | 11/1979 | Brandau | F01M 13/04 | 123/41.86 |
| 5,275,725 A * | 1/1994 | Ishii | B01D 63/084 | 210/321.67 |
| 5,743,925 A * | 4/1998 | Bench | B01D 45/16 | 55/336 |
| 5,882,386 A * | 3/1999 | McAferty | B01D 45/08 | 55/385.4 |
| 5,919,284 A * | 7/1999 | Perry, Jr. | B01D 45/02 | 55/319 |
| 6,168,647 B1 * | 1/2001 | Perry, Jr. | B01D 45/02 | 55/319 |
| 6,202,437 B1 * | 3/2001 | Yun | F04B 39/04 | 62/471 |
| 6,214,220 B1 * | 4/2001 | Favret, Jr. | B01D 17/00 | 210/188 |
| 6,419,730 B1 * | 7/2002 | Chavez | B01D 45/08 | 55/430 |
| 6,702,028 B1 * | 3/2004 | Heggholmen | E21B 43/121 | 166/105.5 |
| 6,945,775 B2 * | 9/2005 | Fraser | C22B 3/02 | 266/197 |
| 7,044,999 B2 * | 5/2006 | Bankstahl | B23K 7/10 | 55/426 |
| 7,785,400 B1 * | 8/2010 | Worley | B01D 19/0042 | 55/423 |
| 9,162,170 B2 * | 10/2015 | Onishi | B01D 39/10 | |
| 2004/0004028 A1 * | 1/2004 | Stell | C10G 9/00 | 208/130 |
| 2005/0166962 A1 * | 8/2005 | Neff | B01D 17/00 | 137/172 |
| 2006/0168995 A1 * | 8/2006 | Fralick | F25B 43/006 | 62/503 |
| 2006/0283159 A1 * | 12/2006 | Scherrer | B01D 45/08 | 55/434 |
| 2007/0215524 A1 * | 9/2007 | Stell | B01D 19/0036 | 208/184 |
| 2009/0141847 A1 * | 6/2009 | Hino | G21C 7/08 | 376/207 |
| 2011/0143296 A1 * | 6/2011 | Fraser | C22B 3/02 | 432/4 |
| 2011/0174155 A1 * | 7/2011 | Fraser | B01D 53/002 | 95/36 |
| 2013/0255312 A1 * | 10/2013 | Elliott | B01D 53/265 | 62/640 |
| 2014/0033917 A1 * | 2/2014 | Rodgers | F23J 15/06 | 95/17 |
| 2014/0048464 A1 * | 2/2014 | Hayakawa | C02F 1/725 | 210/150 |
| 2014/0245892 A1 * | 9/2014 | Hernandez Olvera | B01D 53/38 | 96/235 |
| 2015/0144491 A1 * | 5/2015 | Noguchi | B01D 65/08 | 204/548 |

FOREIGN PATENT DOCUMENTS

| | | |
|---|---|---|
| WO | 9713594 A1 | 4/1997 |
| WO | 03024633 A1 | 3/2003 |

\* cited by examiner

REMOVING PARTICULATES

CROSS REFERENCE TO RELATED APPLICATIONS

This application claims priority from United Kingdom Patent Application No. 16 15 341.3, filed 8 Sep. 2016, the entire disclosure of which is incorporated herein by reference in its entirety.

BACKGROUND OF THE INVENTION

The present invention relates to a method of removing particulates suspended in steam discharged from an autoclave forming part of a solid waste treatment system following processing of solid waste. The present invention also relates to a solid waste treatment system comprising apparatus for the same.

Mechanical heat treatment (mechanical heat treatment) has for some time been proposed as a method for processing solid waste, particularly municipal solid waste. Incoming waste streams are typically screened and then sealed in an autoclave whereupon the waste is charged with steam. An autoclave-based solid waste treatment system is disclosed in International patent publication WO 03/024633 A1, which was devised by the same inventor as the present invention.

During processing, temperatures in the autoclave are typically held at around 160 degrees Celsius at 5 bar gauge for 30 to 60 minutes, with the autoclave rotating to agitate its contents. Vanes in the interior of the autoclave, in conjunction with the rotation, ensure that the waste is uniformly exposed to the steam environment.

Due to this agitation, it is typical for glass and ceramics to be lifted to a height and then fall, causing them to break. These abrasive shards, splinters and particulates become dispersed throughout the treated waste. This can cause damage to downstream plant during evacuation of the autoclave.

BRIEF SUMMARY OF THE INVENTION

According to an aspect of the present invention, there is provided, in a solid waste treatment system comprising an autoclave, a method of removing particulates suspended in steam discharged from the autoclave following processing of solid waste, the method comprising the steps of: exhausting the autoclave to discharge steam therein; routing the steam to the inlet of a separation vessel that further includes an outlet and a baffle between said inlet and said outlet, whereby the baffle is so configured so that steam is incident upon the baffle to reduce its flow velocity; and collecting particulates that drop from suspension in the steam at the bottom of the separation vessel.

According to another aspect of the present invention, there is provided a solid waste treatment system comprising: an autoclave not having a particulate filter at its outlet; piping to route steam exhausted from the outlet autoclave; and a separation vessel having an inlet to receive steam routed by the piping, and further comprising an outlet and a baffle between the inlet and the outlet; wherein: the baffle is so configured so that steam exhausted from said autoclave is incident upon the baffle to reduce the flow velocity thereof, thereby causing particulates to drop from suspension in the steam and collect at the bottom of the separation vessel.

BRIEF DESCRIPTION OF THE DRAWINGS

The invention will now be described by way of example only with reference to the accompanying drawings, which are purely schematic and not to scale, and of which.

DETAILED DESCRIPTION OF THE INVENTION

Figure 1:
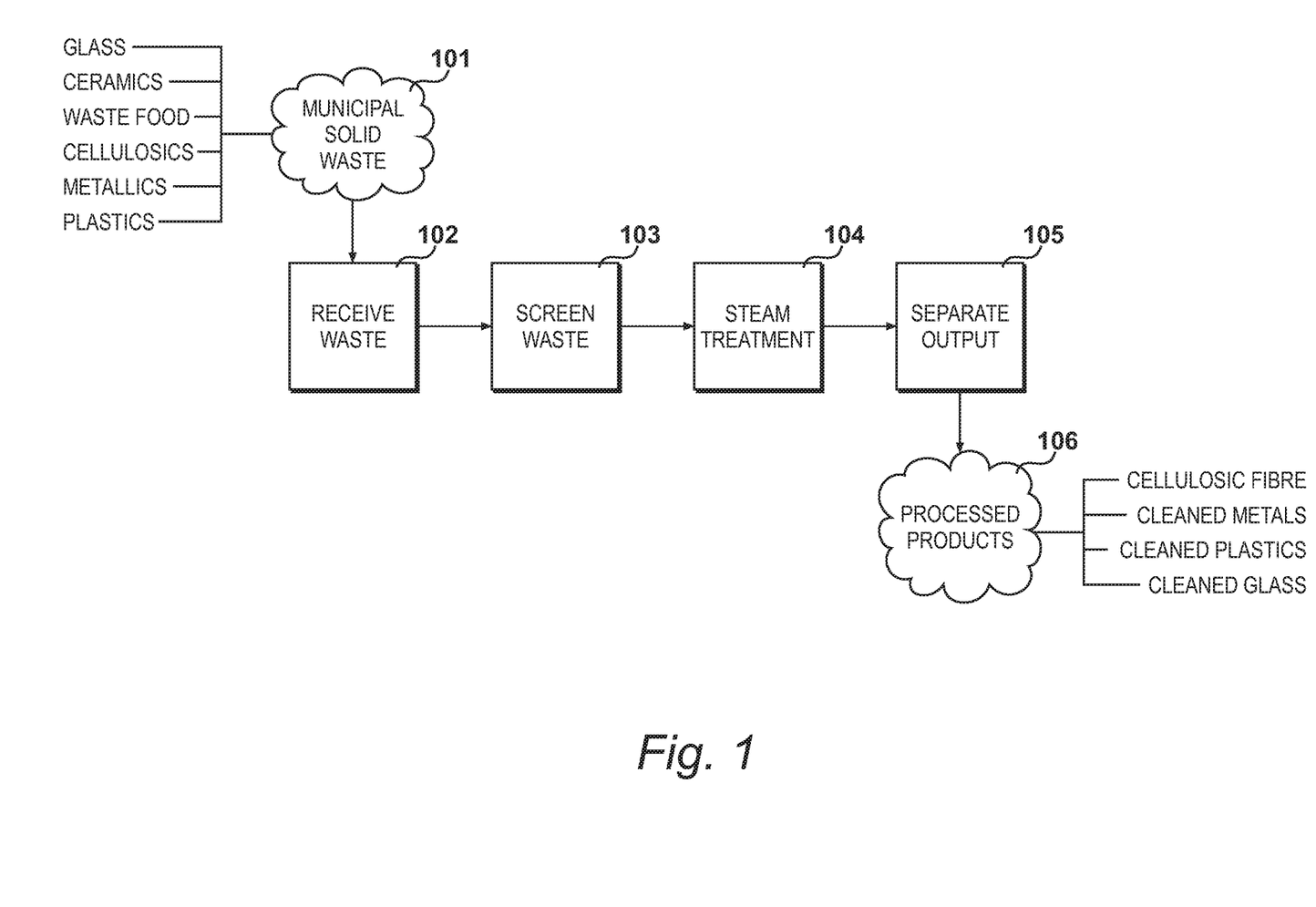
FIG. 1 is process diagram for a solid waste treatment system according to the present invention.

FIG. 1

A process diagram for a solid waste treatment system according to the present invention that uses autoclaving to achieve mechanical heat treatment of waste is illustrated in FIG. 1.

The solid waste in the present example is municipal solid waste (MSW) 101, which typically comprises glass, ceramics, waste food, cellulosics (paper, garden waste), metallics (aluminum cans, iron-based materials etc.) and so on. Initially, MSW 101 is received at a suitable plant at step 102, and then goes through an initial screening process at step 103. This will typically involve manual and/or automatic removal of bulky items which may cause damage to the solid waste treatment system. Waste is then subjected to steam treatment at step 104. The screened waste from step 103 is typically loaded into the autoclave for mechanical heat treatment by means of a conveyor system, with autoclave door operation being achieved automatically by a suitable plant control system. Such a procedure is well known in the art. As previously described, the autoclave is charged with dry steam from a steam storage system 212, comprising a boiler in combination with a steam accumulator. The conditions in the autoclave are brought to 160 degrees Celsius and 5 bar gauge. These conditions are maintained and the autoclave is rotated for a total treatment time of around 30 to 60 minutes. The temperature and pressure are chosen to be high enough to comply with requirements for sterilization of animal by-product, i.e. by killing bacteria, but not too high to begin melting plastic. (For example, chlorine-containing plastics have a melting point of 192 degrees Celsius). In addition, the steam treatment results in labels, paint and grease being stripped from, for example, bottles and containers.

During step 104, all biogenic content of the MSW is converted into what is known as a fiber material which has a high proportion of cellulose content. As the fiber is the organic components of the MSW, it is accompanied by the input metals, plastic and glass, etc.

Thus, following the mechanical heat treatment of the waste in the autoclave, the fiber is separated from the other constituents of the output at step 105. In the present example this step involves passing the waste through various separating apparatus such as eddy current separators and magnetic separators for metals, air knives for glass and ceramics and so on. Such processes are disclosed in the aforementioned International patent publication.

Step 105 enables the output of the solid waste treatment system to be certified as clean re-sale products 106, such as cleaned metals, plastics and glass, along with the cellulosic fiber material. This latter output product may then be used as a fuel source by direct combustion to produce heat and power, or biochemically processed to produce biofuels due to its high polysaccharide content. In trials, acetone, butanol and ethanol (ABE) have successfully been produced. Alternatively, the fiber may undergo a process to produce a biochar material.

Figure 2:
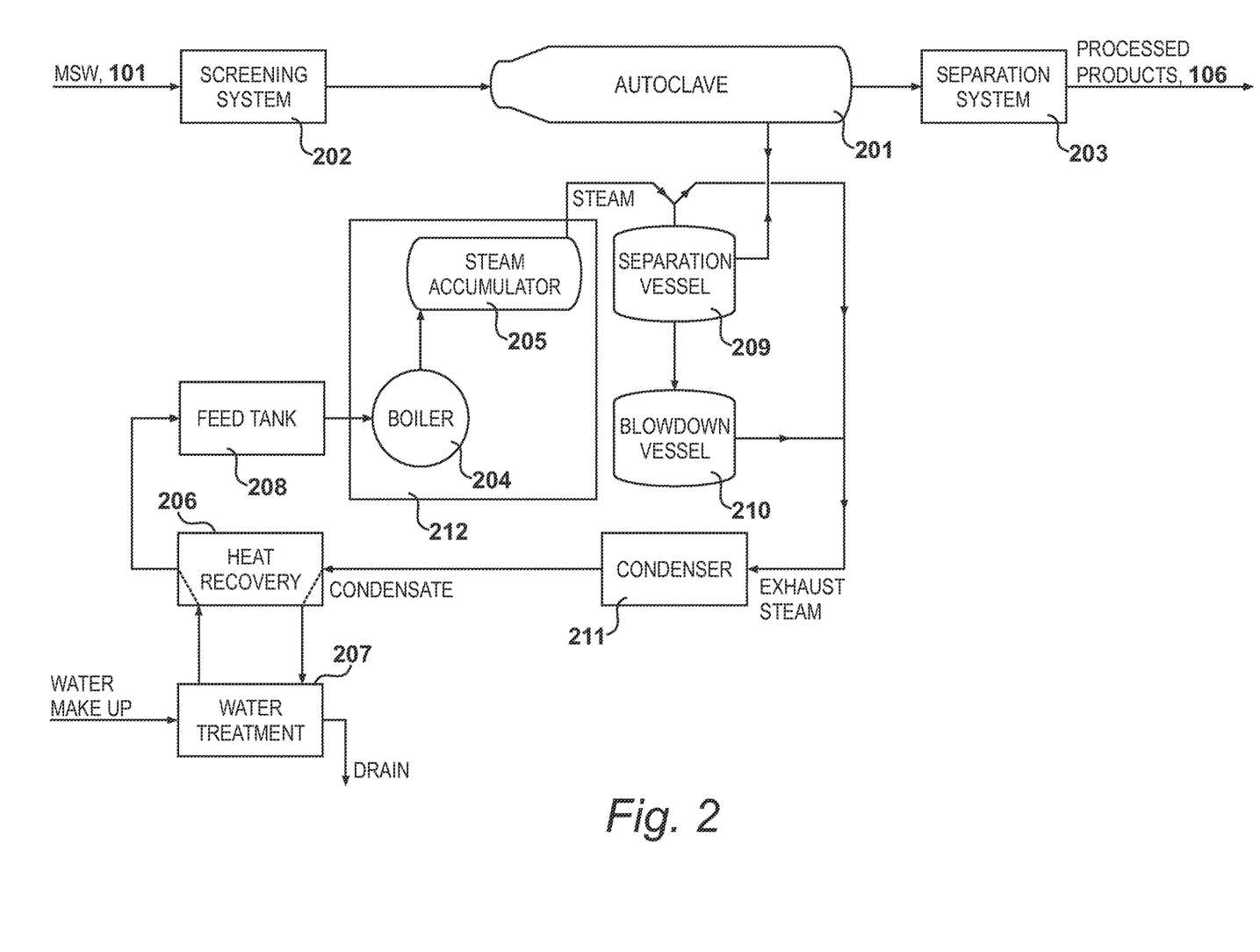
FIG. 2 shows the solid waste treatment system of the present invention.

FIG. 2

The solid waste treatment system of the present invention is shown in FIG. 2. As described previously, in the present embodiment, the solid waste treatment system is adapted to treat municipal solid waste in which the treatment process results in the formation of particulates. It is contemplated, however, that the solid waste treatment system described herein may be used with any form of solid waste.

As described with reference to FIG. 1, the solid waste treatment system comprises an autoclave 201, to which MSW 101 is provided via a screening system 202 which removes bulky items which may damage the autoclave 201. Steam treatment in the autoclave 201 results in the generation of fiber material which is then provided to a separation system 203 to produce clean re-sale products 106.

In order to charge the autoclave 201 with steam for the mechanical heat treatment process, the solid waste treatment system has a steam storage system 212 comprising a boiler 204 and a steam accumulator 205. This allows the efficient production of dry, saturated steam. Water for the boiler 204 is pre-heated to a temperature below its boiling point, such as 80 degrees Celsius, in a heat recovery system 206 following treatment in a water treatment system 207, which comprises water purification apparatus of the known type. In an example, the heat recovery system 206 utilizes a heat exchanger system for recovering heat from steam and condensate exhausted from the autoclave 201 during and after the mechanical heat treatment process. Contaminated water from the autoclave 201 is, following heat recovery, then passed to the water treatment system 207 for purification along with further processing by odor abatement apparatus of the known type therein.

Pre-heated water from the heat recovery system 206 is supplied to a feed tank 208 for storage and pre-treatment to remove impurities prior to being fed to the boiler 204.

Due to the high residual vapor pressure in the autoclave 201, steam is discharged at relatively high velocities, typically critical velocity. The velocity of steam exiting the autoclave 201 is dictated by the pressure differential. At the beginning of the discharge stage there is a large pressure differential, greater than critical pressure drop, and so the velocity is high. Gradually as steam is discharged, the pressure differential will drop and in order to maintain a sufficient flow velocity it may be necessary to apply a vacuum to maintain the rate of discharge. Appropriate vacuum apparatus (not shown) may therefore be provided downstream of the separation vessel 209 to facilitate this.

The steam when being exhausted from the autoclave 201 will tend to carry entrained with it some particulates such as splinters of glass, ceramic fragments and fiber. These particulates are abrasive and may damage components and equipment downstream in the system. They may also clog mesh filters.

If, as is conventional, the steam were to be vented to atmosphere, this would not be so problematic. However, it is desirable keep the steam in the system rather than venting it to atmosphere, in order to abate odors and to remove chemical impurities caused by its interaction with the waste by way of the water treatment system 207, and furthermore to recover thermal energy in heat recovery system 206 as described previously so that the condensate can be re-used as boiler feedwater.

The solid waste treatment system of the present invention therefore includes a separation vessel 209 operative to separate particulates from the flow of steam exiting the autoclave 201. In addition, autoclave 201 forming part of the solid waste treatment system of the present invention specifically does not have a particulate filter at its own outlet. A blowdown vessel 210 is provided below the separation vessel 209 for receipt of the particulates from the separation vessel 210. In this way, there is no filtration means in the autoclave which may become blocked.

Steam exiting the autoclave 201 following mechanical heat treatment is received at an inlet of the separation vessel 201, and passes, via an outlet, onward to the heat recovery system 206 via a condenser 211.

As will be described further with reference to FIG. 3, input steam from the steam accumulator 205 during the charging of the autoclave 201 prior to mechanical heat treatment is routed via the outlet of the separation vessel 209 and onward, via its inlet, to the autoclave 201. Appropriate valve control, described further with reference to FIGS. 4 and 5, facilitates this routing of the steam during the various operational phases of the system.

Figure 3:
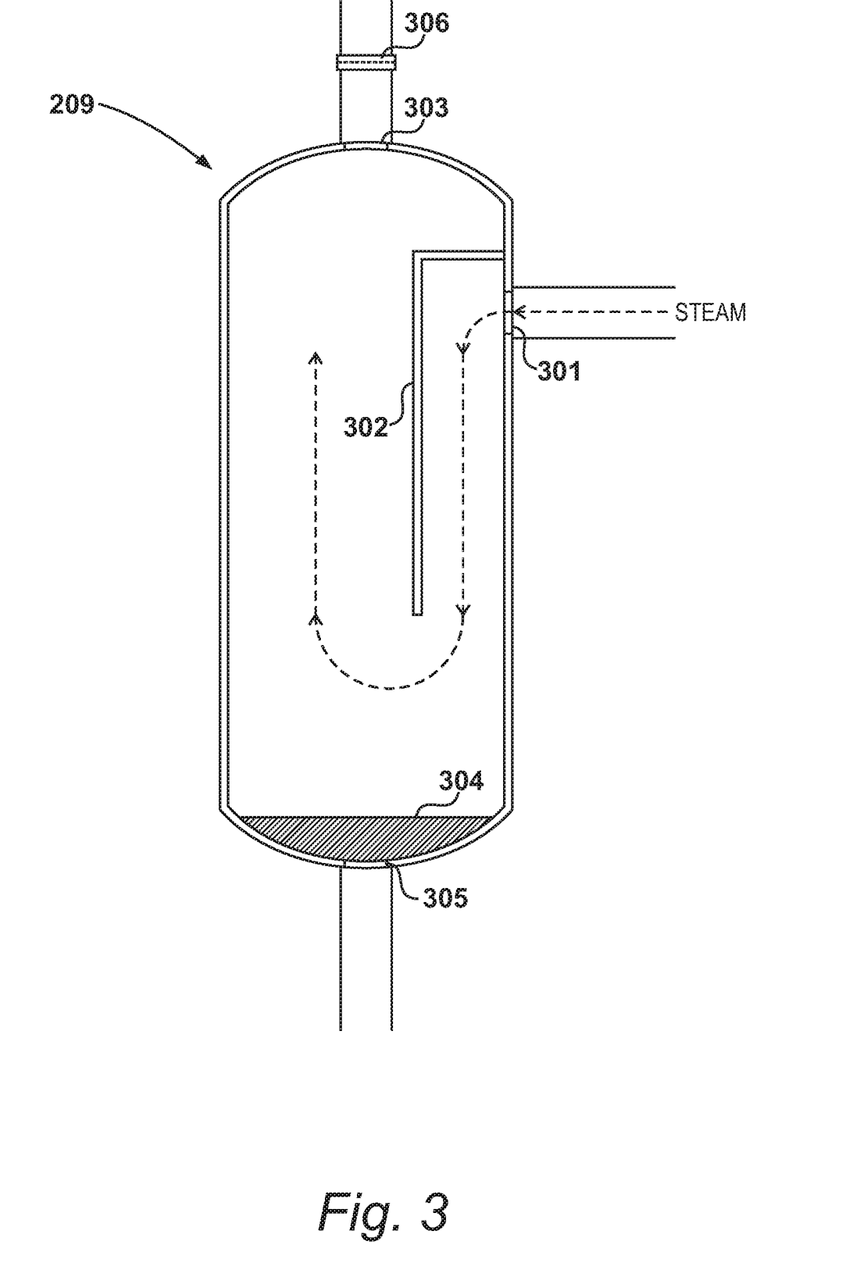
FIG. 3 shows the separation vessel 209.

FIG. 3

A cross sectional view of the separation vessel 209 is shown in FIG. 3.

As described previously, steam being discharged from the autoclave 201 following mechanical heat treatment is routed to an inlet 301 of the separation vessel 209. The piping at the inlet in the present embodiment of the solid waste treatment system has a diameter of 200 millimeters. The diameter of the separation vessel 209 is much larger, and in the present example is 1 meter in diameter. Furthermore, the separation vessel 209 includes a baffle 302 between the inlet 301 and an outlet 303 of the separation vessel 209. The baffle is configured so that steam entering the separation vessel 209 is incident upon it to reduce its flow velocity. Thus, in the present example the baffle 302 extends perpendicularly with respect to the inlet 301. Thus, with the inlet 301 in the present example being arranged on the side of the separation vessel 209, the baffle extends substantially downward from the top of the interior of the vessel. As illustrated in FIG. 3, this encourages the steam being exhausted from the autoclave 201 to follow a generally U-shaped path.

The combination of routing the steam into a separation vessel and having that steam meet the baffle results in a large reduction in the velocity of the steam. Particulates will tend to be deposited in the bottom of the separation vessel 209, illustrated at 304, and the steam leaving the separation vessel 209 via the outlet 303 should be substantially clean.

As described previously, beneath the separation vessel 209 a blowdown vessel 210 is provided. An auxiliary outlet 305 is provided at the bottom of the separation vessel 209 to allow the particulates 304 to be ejected from the separation vessel 209 using blowdown. This process will be described further with reference to FIGS. 4 and 6.

In order to ensure that the steam exiting is as clean as possible, in a specific embodiment a wedge wire filter 306 is positioned in the pipe from the outlet 303 of the separation vessel 209. In this way, if any particulates did not drop from suspension in the separation vessel 209 they will be caught. Recalling that in the waste treatment system of the present invention, steam is charged from the accumulator 205 via the outlet 303, the inlet 301 and into the autoclave, any particulates collected on the filter 305 will, during the charging cycle, be blown off the wedge wire filter 306 to the base of the separation vessel 209 to join the other deposited particulates 304.

In this way, all particulates entrained in the steam are confined between the autoclave 201 and the filter 306, and do not reach the downstream treatment systems. Advantageously, the arrangement of the present invention means that there are no filters that may clog within the autoclave 201 itself which are difficult to access.

Figure 4:
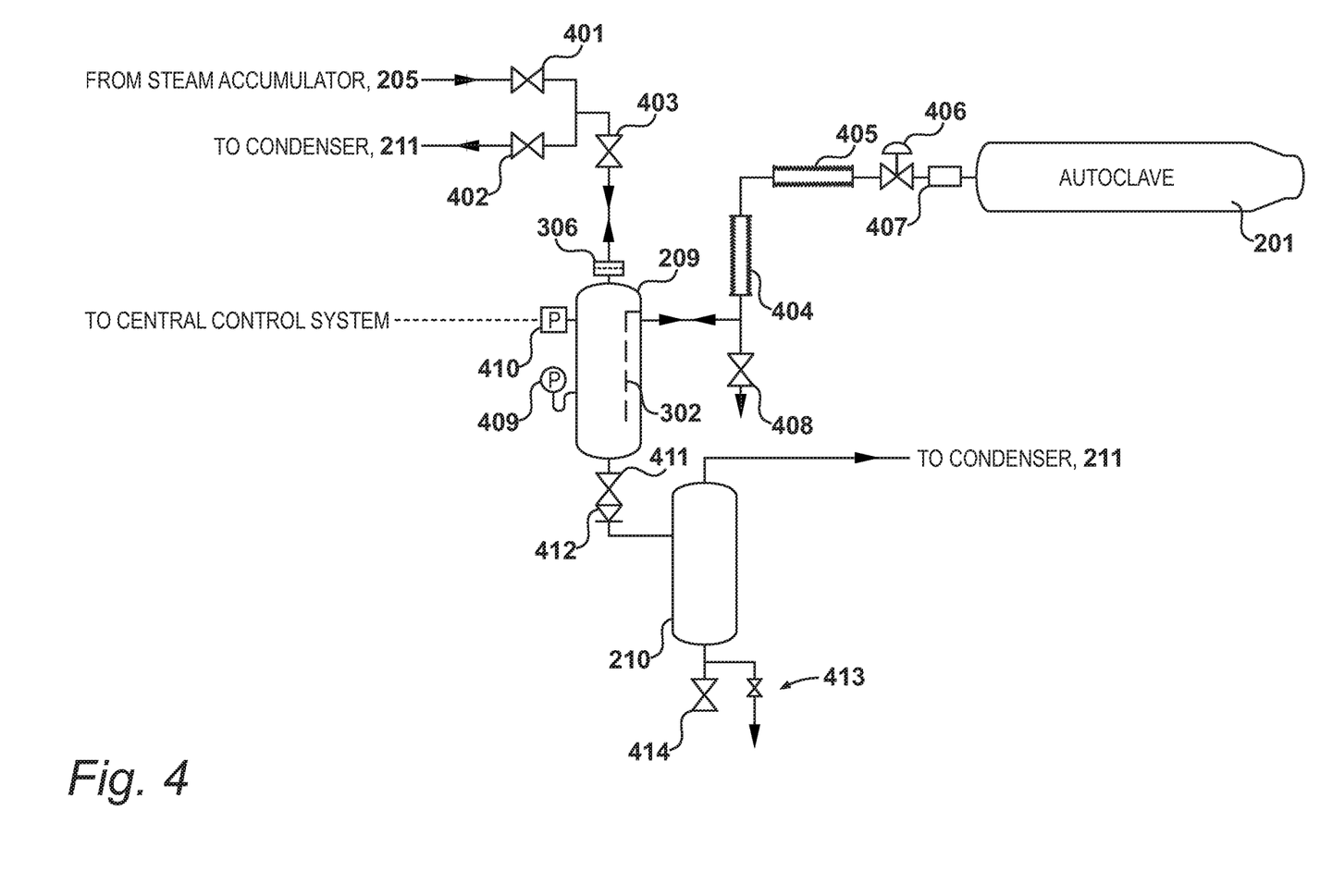
FIG. 4 is piping and instrumentation diagram of the autoclave 201, the separation vessel 209 and the blowdown vessel 210.

FIG. 4

A piping and instrumentation diagram of the autoclave 201, the separation vessel 209 and the blowdown vessel 210 is shown in FIG. 4.

In order to facilitate the charging and discharging of steam from the autoclave 201 as previously described, a network of valves is provided before the separation vessel 209. A first valve 401 controls flow of steam from the steam accumulator 205, and a second valve 402 controls flow of steam to the condenser 211 and the heat recovery system 206. A third valve 403 is provided should the separation vessel 209 need to be isolated from the plant in the input path and the output path. Appropriate control logic may achieve the effect of a NOT gate by closing the third valve prior to opening or closing of the first and second valves. The charging and discharge cycle will be described further with reference to FIG. 5.

The inlet 301 of the separation vessel 209 is connect to the autoclave 201 by flexible piping 404 and 405 for isolation of vibration, a control valve 406, and a rotary union 407. The control valve 406 allows isolation of the autoclave, and a fourth valve 408 allow steam to be vented in case of emergency.

Once the autoclave 201 has been brought to the correct temperature and pressure, the first valve 401 and the second valve 402 are closed. It will therefore be appreciated that the separation vessel 209 forms part of the high pressure part of the system. Thus, in an embodiment, a pressure gauge 409 and, optionally, an electronic pressure transducer 410 for connection to a central plant control system are provided on the separation vessel 209. This means that pressure readings do not have to be taken from the rotating autoclave 201 during the mechanical heat treatment process.

As described previously, it is periodically necessary to remove the particulates deposited at the bottom of the separation vessel 209. A fifth valve 411 in combination with a one-way valve 412 are provided in the pipe between the auxiliary outlet 305 of the separation vessel 209 and an inlet of the blowdown vessel 210. The blowdown vessel 210 is connected to the condenser 211, and is open to atmosphere and thus remains at atmospheric pressure. Removal of condensate is facilitated by a drain 413, and particulates and debris blown into the blowdown vessel 210 may be removed from it by way of a knife valve 414. The blowdown process will be described with reference to FIG. 6.

Figure 5:
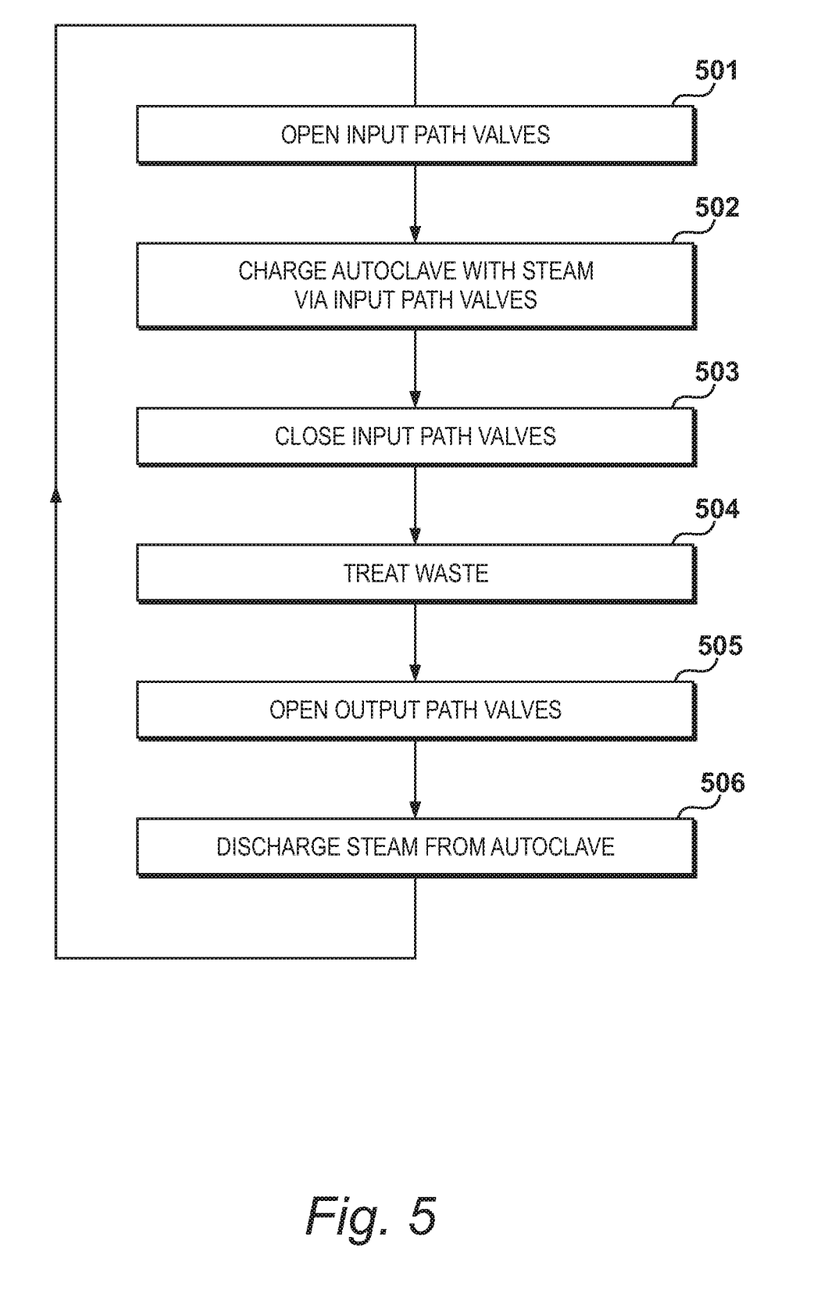
FIG. 5 shows procedures undertaken to charge and discharge the autoclave 201.

FIG. 5

The charge and discharge cycle is detailed in FIG. 5.

Assuming that initially all valves are closed and the autoclave has been loaded with waste, at step 501, an input path for steam is created by opened by opening first valve 401 and the third valve 403. Steam then enters the separation vessel 209, resulting in removal of particulates caught on wedge wire filter 306. This has the added effect of removing any condensate entrained within the charging steam due to the reduction in flow velocity due to the steam entering the larger-diameter separation vessel from the smaller-diameter pipework.

When the autoclave 201 has been brought to the correct temperature and pressure, both the first valve 401 and the third valve 403 are closed at step 504. The waste in the autoclave 201 is treated at step 505. As will be appreciated by those skilled in the art, the first valve 401 and the third valve 403 may be configured to remain open by an amount sufficient to allow the provision of make up steam, thereby compensating for any radiation loss during the mechanical heat treatment period.

When step 505 is complete after 30 to 60 minutes, an output path for steam to be discharged is created by opening second valve 402 and third valve 403 at step 505, beginning the process of discharging the autoclave at step 506. This may include the activation of vacuum pump apparatus to fully remove the steam from the autoclave 201. The provision of the baffle 302 reduces the flow velocity of the steam, resulting in particulates dropping from suspension and collect at the bottom of the separation vessel.

When the steam has been removed from the autoclave 201, the output path valves remain open and treated waste may then be unloaded ready for the next batch.

Figure 6:
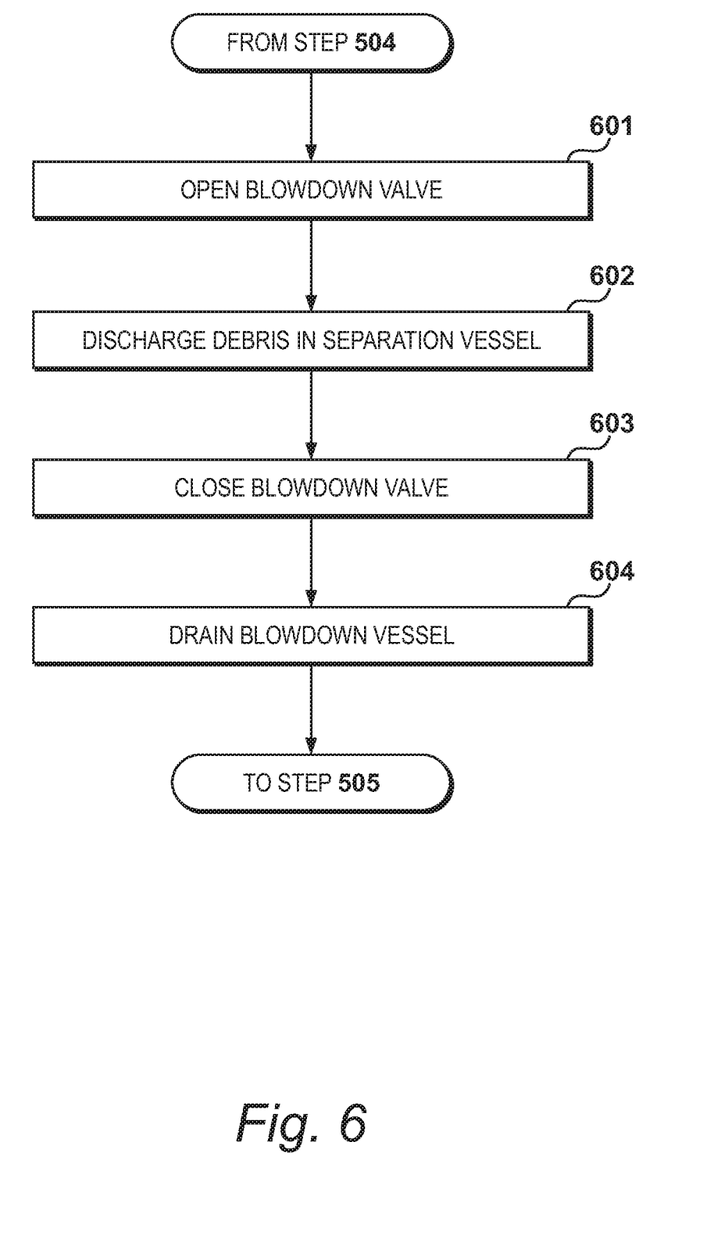
FIG. 6 shows procedures to discharge particulates collected in the separation vessel 209.

FIG. 6

Procedures undertaken to remove the deposits of particulate matter at the bottom of the separation vessel 209 are detailed in FIG. 6. This procedure is carried out between the end of step 504 and the beginning of step 505, either each discharge cycle or on a periodic basis.

At the end of step 504, the separation vessel 209 along with the autoclave 201 are still at top pressure. Thus at step 601, blowdown valve 410 is opened and debris collected at the bottom of the separation vessel 209 (at pressure) is discharged into the blowdown vessel 210 (not at pressure) at step 602.

Following discharge of debris into the blowdown vessel 210, valve 410 is closed at step 603.

At step 604, the debris in the blowdown vessel 210 is removed via drain 413 and knife valve 414 and may then be subjected to further processing to enable recycling. The main process then continues to step 505 to discharge steam from the high-pressure side of the system.

The invention claimed is:

1. A method comprising providing a solid waste treatment system, further comprising providing an autoclave having a steam outlet, a particulate filter, removing particulates suspended in steam discharged from the steam outlet of the autoclave following processing of solid waste, the method comprising the steps of:

discharging steam from the autoclave via the steam outlet;

routing the discharged steam to an inlet of a separation vessel that further includes an outlet and a baffle between said inlet and said outlet, whereby the baffle is so configured so that steam is incident upon the baffle to reduce its flow velocity, and therein the particulate filter is provided after the outlet of the separation vessel to catch particulates in the steam exiting the separation vessel;

charging the autoclave with steam routed from a steam storage system via the steam outlet and then the inlet of the separation vessel, thereby forcing particulates caught in the filter to be removed therefrom and to drop to a bottom of the separation vessel; and collecting particulates that drop from suspension in the steam and from said filter at the bottom of the separation vessel.

2. The method of claim 1, in which the baffle is configured to extend perpendicularly with respect to the flow of the steam at the inlet.

3. The method of claim 2, in which the baffle extends downwardly to force the steam on a U-shaped path.

4. The method of claim 1, in which the separation vessel further comprises a valve at the outlet of the separation vessel, and the method further comprises the step of:

closing the valve after charging the autoclave, so that the separation vessel is at the same pressure as the autoclave.

5. The method of claim 4, in which the separation vessel further comprises a pressure gauge to allow readings to be taken from the separation vessel, rather than the autoclave during processing of solid waste.

6. The method of claim 5, in which the separation vessel further comprises a purge valve at its base, and the method further comprises:

charging the separation vessel with steam; and
opening the purge valve to achieve blowdown of particulates collected at the bottom of the separation vessel.

7. The method of claim 6, in which a purge valve is located between the separation vessel and a blowdown vessel maintained at atmospheric pressure.

8. The method of claim 1, in which the solid waste is municipal solid waste and the particulates are glass.

9. A system comprising:

a solid waste treatment system, further comprising:
an autoclave having a steam outlet without a particulate filter;
a separation vessel having an inlet, an outlet, and a baffle between the inlet and the outlet;
piping between said steam outlet of said autoclave and the inlet of said separation vessel;
a steam storage system connected to the outlet of the separation vessel; and
a filter after the outlet of the separation vessel;

wherein:
steam exhausted from said autoclave is routed from said steam outlet of said autoclave through said piping, and through said separation vessel via the inlet and then the outlet;
the baffle is configured so that said steam exhausted from said autoclave is incident upon the baffle to reduce the flow velocity thereof, thereby causing particulates to drop from suspension in the steam and collect at a bottom of the separation vessel, whereafter any remaining particulates are caught in said filter; and
steam from said steam storage system to charge said autoclave is routed through the separation vessel via the filter and outlet and then the inlet, and through said piping to said steam outlet, whereby particulates caught in the filter are removed therefrom and drop to the bottom of the separation vessel.

10. The solid waste treatment system of claim 9, in which the baffle extends perpendicularly with respect to the flow of the steam at the inlet.

11. The solid waste treatment system of claim 10, in which the baffle extends downwardly to force the steam on a U-shaped path.

12. The solid waste treatment system of claim 9, in which the separation vessel further comprises a valve at the outlet of the separation vessel which is closed after charging the autoclave, so that the separation vessel is at the same pressure as the autoclave.

13. The solid waste treatment system of claim 12, in which the separation vessel further comprises a pressure gauge to allow pressure readings to be taken from the separation vessel, rather than the autoclave during processing of solid waste.

14. The solid waste treatment system of claim 13, in which the separation vessel further comprises a purge valve at its base, which, following charging of the separation vessel with steam, is opened to achieve blowdown of particulates collected at the bottom of the separation vessel.

15. The solid waste treatment system of claim 14, in which purge valve is located between the separation vessel and a blowdown vessel maintained at atmospheric pressure.

16. The solid waste treatment system of claim 9, in which the solid waste is municipal solid waste and the particulates are glass.

* * * * *